(12) United States Patent
Choudhary et al.

(10) Patent No.: US 10,324,809 B2
(45) Date of Patent: Jun. 18, 2019

(54) CACHE RECOVERY FOR FAILED DATABASE INSTANCES

(71) Applicant: Oracle International Corporation, Redwood Shores, CA (US)

(72) Inventors: Dungara Ram Choudhary, Fremont, CA (US); Yu Kin Ho, Fremont, CA (US); Norman Lee, Santa Clara, CA (US); Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2 days.

(21) Appl. No.: 15/262,380

(22) Filed: Sep. 12, 2016

(65) Prior Publication Data

US 2018/0074917 A1  Mar. 15, 2018

(51) Int. Cl.
*G06F 11/16* (2006.01)
*G06F 11/14* (2006.01)
(Continued)

(52) U.S. Cl.
CPC ...... *G06F 11/1471* (2013.01); *G06F 11/1446* (2013.01); *G06F 11/1658* (2013.01);
(Continued)

(58) Field of Classification Search
CPC ......... G06F 2201/80; G06F 2009/4557; G06F 9/45558; G06F 11/1658; G06F 11/1662;
(Continued)

(56) References Cited

U.S. PATENT DOCUMENTS

| 5,897,634 A | 4/1999 | Attaluri et al. |
| 6,078,994 A | 6/2000 | Carey |

(Continued)

FOREIGN PATENT DOCUMENTS

KR  10-2010-0131054  12/2010

OTHER PUBLICATIONS

Yadgar et al., "Karma: Know it All Replacement for a Multilevel Cache", dated Jan. 1, 2007, 16 pages.

(Continued)

*Primary Examiner* — Joseph O Schell
(74) *Attorney, Agent, or Firm* — Hickman Palermo Becker Bingham LLP

(57) ABSTRACT

Techniques related to cache recovery for failed database instances are disclosed. A first database instance and a second database instance share a primary persistent storage and a secondary persistent storage. Each database instance stores, in volatile memory, a respective primary cache of a respective set of data stored on the primary persistent storage. Each database instance also stores, in volatile memory, a respective set of header data. Further, each database instance moves the respective set of data from the respective primary cache to a respective secondary cache on the secondary persistent storage. Still further, each database instance stores, on the secondary persistent storage, a respective set of persistent metadata. When the first database instance becomes inoperative, the second database instance retrieves, from the secondary persistent storage, persistent metadata corresponding to data stored in a secondary cache of the first database instance. Header data is generated based on the persistent metadata.

20 Claims, 8 Drawing Sheets

(51) Int. Cl.
  *G06F 12/0897* (2016.01)
  *G06F 11/20* (2006.01)
  *G06F 9/455* (2018.01)

(52) U.S. Cl.
  CPC ...... *G06F 11/1662* (2013.01); *G06F 11/2023* (2013.01); *G06F 12/0897* (2013.01); *G06F 9/45558* (2013.01); *G06F 11/1415* (2013.01); *G06F 11/1666* (2013.01); *G06F 11/202* (2013.01); *G06F 11/2043* (2013.01); *G06F 11/2046* (2013.01); *G06F 2201/80* (2013.01); *G06F 2201/805* (2013.01); *G06F 2201/82* (2013.01); *G06F 2212/1024* (2013.01); *G06F 2212/1032* (2013.01); *G06F 2212/1041* (2013.01)

(58) Field of Classification Search
  CPC .... G06F 11/1666; G06F 11/20; G06F 11/202; G06F 11/2046; G06F 11/2023; G06F 11/2043; G06F 11/1402; G06F 11/1415; G06F 11/1446; G06F 11/1471; G06F 11/1474
  See application file for complete search history.

(56) References Cited

U.S. PATENT DOCUMENTS

| | | | |
|---|---|---|---|
| 6,434,672 B1 | 8/2002 | Gaither | |
| 6,557,082 B1 | 4/2003 | Josten et al. | |
| 6,732,124 B1* | 5/2004 | Koseki | G06F 11/1435 |
| 7,581,064 B1 | 8/2009 | Zedlewski | |
| 7,822,727 B1 | 10/2010 | Shaughnessy | |
| 7,840,752 B2 | 11/2010 | Hu et al. | |
| 8,401,994 B2 | 3/2013 | Hoang et al. | |
| 8,429,134 B2 | 4/2013 | Chan | |
| 8,489,820 B1 | 7/2013 | Ellard | |
| 9,251,003 B1* | 2/2016 | Gupta | G06F 11/1469 |
| 9,317,375 B1* | 4/2016 | Sadhu | G06F 11/1451 |
| 9,569,475 B2 | 2/2017 | Hoang et al. | |
| 9,613,064 B1* | 4/2017 | Chou | G06F 17/30289 |
| 9,703,706 B2 | 7/2017 | Bagal et al. | |
| 9,892,153 B2 | 2/2018 | Li et al. | |
| 9,928,147 B2* | 3/2018 | Li | G06F 11/1471 |
| 2002/0026448 A1 | 2/2002 | Bird et al. | |
| 2002/0052914 A1 | 5/2002 | Zalewski et al. | |
| 2003/0167380 A1* | 9/2003 | Green | G06F 11/1446 711/136 |
| 2004/0117572 A1* | 6/2004 | Welsh | G06F 11/1451 711/162 |
| 2004/0215883 A1 | 10/2004 | Bamford et al. | |
| 2005/0193160 A1 | 9/2005 | Bhatt et al. | |
| 2005/0204112 A1 | 9/2005 | O'Connor et al. | |
| 2005/0223174 A1 | 10/2005 | Mogi | |
| 2006/0143256 A1 | 6/2006 | Galchev | |
| 2006/0248131 A1 | 11/2006 | Marwinski et al. | |
| 2009/0164733 A1 | 6/2009 | Kim et al. | |
| 2009/0276654 A1 | 11/2009 | Butterworth et al. | |
| 2010/0122026 A1 | 5/2010 | Umamageswaran et al. | |
| 2010/0185817 A1 | 7/2010 | Magenheimer | |
| 2011/0060724 A1* | 3/2011 | Chan | G06F 11/1469 707/683 |
| 2011/0113036 A1 | 5/2011 | Idicula et al. | |
| 2012/0005158 A1 | 1/2012 | Bhatt et al. | |
| 2012/0221768 A1 | 8/2012 | Bagal et al. | |

OTHER PUBLICATIONS

Wong, Theodore M., and Wilkes, John, "My cache or yours? Making storage more exclusive." Jun. 2002. USENIX. FAST '02.

Venkatarman, Shivakumar, Global Memory Management for Multi-Server Database Systems. 1996. University of Wisconsin—Madison. pp. 24-32.

Soundararajan, Gokul et al., "Dynamic Partitioning of the Cache Hierarchy in Shared Data Centers." Aug. 2008. ACM. '08. pp. 635-646.

Rik Van Riel "Page replacement in Linux 2.4 memory management." Jun. 2001. USENIX; FREENIX 2001.

Peetz, Andreas, "A Myth Busted and an FAQ: ESXi is *not* Based on Linux! But what is it?", dated Aug. 2013, http://www.vfront.de/2013/08a-myth-busted-and-faqe-sxi-is-not based.html.

Liu, Xin et al. "CLIC: Client-Informed Caching for Storage Servers." Feb. 2009. USENIX. FAST '09. pp. 297-310.

Koltsidas, Ioannis and Viglas, Stratis D., "The Case for Flash-Aware Multi-Level Caching." 2009. University of Edinburgh. Tech Report EDI-INF-RR-1319.

Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.

Hennessy, John L., and Patterson, David A., Computer Architecture: A Quantitative Approach. 2007; Elsevier. 4th ed. pp. 287-315.

Chandrasekaran, Sashikanth and Bamford, Roger, "Shared Cache—The Future of Parallel Databases." Mar. 2003. ICDE'03. pp. 840-850.

"In the Lab: Full ESX/vMotion Test Lab in a Box, Part 2", dated Aug. 2009, https://blog.solori.net/2009/08/17/in-the-lab-full-escmotion-test-lab-in-a-box-part-2/.

"In the Lab: Full ESX/vMotion Test Lab in a Box, Part 1", dated Aug. 2009, https://blog.solori.net/2009/08/17/in-the-lab-full-escmotion-test-lab-in-a-box-part-1/.

U.S. Appl. No. 13/037,172, Filed Feb. 28, 2011, Final Office Action dated Apr. 16, 2015.

Bagal, U.S. Appl. No. 13/037,172, Filed Feb. 28, 2011, Notice of Allowance dated Mar. 1, 2017.

Bagal, U.S. Appl. No. 13/037,172, Filed Feb. 28, 2011, Office Action dated Jan. 7, 2013.

Bagal, U.S. Appl. No. 13/037,172, Filed Feb. 28, 2011, Office Action dated May 23, 2013.

Bagal, U.S. Appl. No. 13/037,172, Filed on Feb. 28, 2011, Notice of Allowance dated Mar. 1, 2017.

Bagal, U.S. Appl. No. 13/037,172, Filed on Feb. 28, 2011, Office Action dated Nov. 9, 2016.

Bagal, U.S. Appl. No. 13/037,172, Filed Feb. 28, 2011, Final Office Action dated Sep. 16, 2013.

U.S. Appl. No. 13/037,172, Filed Feb. 28, 2011, Final Office Action dated Mar. 29, 2016.

U.S. Appl. No. 13/037,172, Filed Feb. 28, 2011, Office Action dated Nov. 5, 2015.

U.S. Appl. No. 13/037,172, Filed Feb. 28, 2011, Final Office Action dated Sep. 16, 2013.

U.S. Appl. No. 13/037,172, Filed Feb. 28, 2011, Interview Summary dated Jul. 5, 2016.

U.S. Appl. No. 13/037,172, Filed Feb. 28, 2011, Interview Summary dated Nov. 9, 2016.

U.S. Appl. No. 13/037,172, Filed Feb. 28, 2011, Office Action dated Jan. 7, 2013.

U.S. Appl. No. 13/037,172, Filed Feb. 28, 2011, Office Action dated May 23, 2013.

U.S. Appl. No. 13/037,172, Filed Feb. 28, 2011, Office Action dated Nov. 6, 2014.

U.S. Appl. No. 13/037,172, Filed Feb. 28, 2011, Advisory Action dated Jul. 12, 2016.

* cited by examiner

CACHE RECOVERY FOR FAILED DATABASE INSTANCES

FIELD OF THE DISCLOSURE

Embodiments relate to database systems and more specifically, to cache recovery for failed database instances.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A clustered database system that runs on multiple computing nodes offers several advantages, such as fault tolerance and/or load balancing, over a database system running on a single computing node. In some example embodiments, a clustered database system includes a plurality of database servers or "instances" that share resources, including a database. FIG. 1 depicts an example clustered database system comprising database instance 100 and database instance 126 that share primary persistent storage 138. Although the example of FIG. 1 depicts two database instances, in some example embodiments, a clustered database system may include more than two database instances.

Database instance 100, 126 may be a collection of memory and processes that interact with data stored on primary persistent storage 138. Database instance 100 and database instance 126 may collectively implement server-side functions of a database management system. To ensure data consistency, each database instance of a clustered database system may acquire mastership of one or more resources. Referring to FIG. 1, set of data 140 and set of data 142 are stored on primary persistent storage 138. Thus, database instance 100 may be a master database instance for set of data 140, and database instance 126 may be a master database instance for set of data 142. Modifying particular data involves obtaining permission from the master database instance of the particular data. Thus, modifying set of data 140 involves obtaining permission from database instance 100, and modifying set of data 142 involves obtaining permission from database instance 126.

Primary persistent storage 138 may be one or more systems that store data structures in files, such as data blocks. For example, primary persistent storage 138 may include a virtual disk and/or one or more physical disks. Data stored on primary persistent storage 138 survives system failure. However, retrieving the data is typically a relatively slow and computationally expensive process.

For efficient data access, a database system typically maintains one or more caches of data in volatile memory, such as main memory or random-access memory. In the example of FIG. 1, database instance 100 includes volatile memory 102, and database instance 126 includes volatile memory 128. Volatile memory 102 and volatile memory 128 may be the same volatile memory of a single computing device or separate volatile memories of separate computing devices.

Referring to FIG. 1, volatile memory 102 includes primary cache 104, and volatile memory 128 includes primary cache 130. Database instance 100 stores set of data 108 in primary cache 104, and database instance 126 stores set of data 134 in primary cache 130. In some example embodiments, each database instance may maintain a respective primary cache of data for which the database instance has become a master database instance. Thus, set of data 140 may be stored as set of data 108 in primary cache 104, and set of data 142 may be stored as set of data 134 in primary cache 130.

Increased efficiency of data access may be achieved based on increasing the amount of data that can be cached. However, adding volatile memory to a database system may be cost-prohibitive. Thus, a cost-effective alternative is to supplement volatile memory with relatively inexpensive forms of low-latency non-volatile memory, such as flash memory or any other solid-state drive (SSD).

In FIG. 1, secondary persistent storage 112 is an example of non-volatile memory that is used to supplement volatile memories 102, 128. Like primary persistent storage 138, secondary persistent storage 112 is shared by database instances 100 and 126. Secondary persistent storage 112 may be partitioned into a plurality of secondary caches, such as secondary cache 114 and secondary cache 120. Each database instance may maintain a respective secondary cache of data for which the database instance has become a master database instance. Thus, set of data 108 may be stored as set of data 116 in secondary cache 114, and set of data 134 may be stored as set of data 122 in secondary cache 120.

In some example embodiments, a secondary cache may serve as an extension of a primary cache. Typically, lower priority data is moved from a primary cache to a secondary cache. Examples of lower priority data include data that is accessed with a relatively lower frequency, data that is relatively older, and data that is stored at a higher compression level. To track data that has been cached to the secondary cache, header information is stored in volatile memory. The header information is read and consulted to retrieve the data stored in the secondary cache. FIG. 1 depicts set of header data 106 and set of header data 132 as being stored in primary cache 104 and primary cache 130, respectively. However, in some example embodiments, header data may be stored outside of a primary cache in volatile memory.

When a database instance fails, data stored in volatile memory may be lost. This data includes header data. In contrast, data stored in non-volatile memory typically survives any failure. However, the data stored in non-volatile memory is inaccessible without access to corresponding header data.

During instance recovery, the secondary cache is completely repopulated, even though valid data there had survived. This is because the header data that may be used to determine what valid data is in the secondary cache is not available. Unfortunately, repopulating a cache involves a significant amount of time, and in the interim, data access may exhibit decreased throughput and increased response times, for example, due to data retrieval from primary persistent storage 138.

Thus, an approach for quickly recovering data stored in a non-volatile memory cache is beneficial and desirable.

Figure 1:
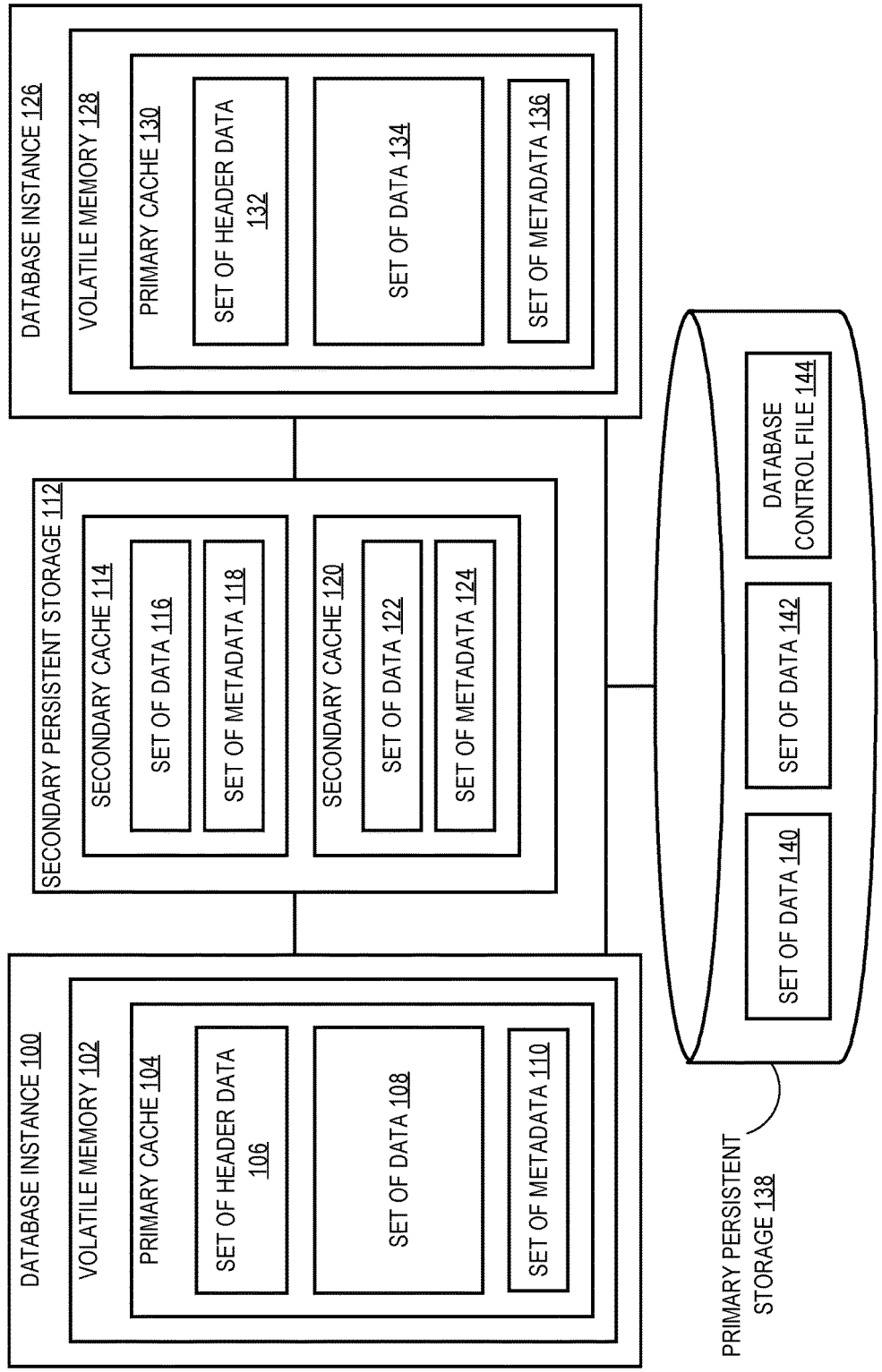
FIG. 1 depicts an example computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

General Overview

A clustered database system may include multiple database instances that share a database maintained on persistent storage, such as a magnetic disk. The multiple database instances also share low-latency form of non-volatile memory used for caching, such as a SSD. Data stored in the shared low-latency form of non-volatile memory can be accessed more quickly than other forms of non-volatile memory, such as magnetic disk. Each database instance may be a master of a respective subset of the database. Each master database instance may use the shared low-latency non-volatile memory to cache the respective subset of the database of the master.

Each master database instance stores header data in volatile memory. Each set of header data includes memory addresses associated with cached data stored in the shared non-volatile memory and whether that cached data is a valid or invalid cache copy.

The low-latency form of non-volatile memory stores a respective set of persistent metadata for each master database instance. Each set of persistent metadata includes one or more memory addresses of data stored in the low-latency form of non-volatile memory. Unlike data stored in volatile memory, persistent metadata stored in the low-latency form of non-volatile memory may survive an instance failure and can be used to recreate a corresponding set of header data in volatile memory.

For example, when a first database instance fails, a second database instance may recover a portion ("recoverable data") of the surviving cached data that the first database instance stored in the low-latency form of non-volatile memory. To do so, the second database instance may acquire mastership of the data. Acquiring mastership may involve retrieving, from the low-latency form of non-volatile memory, persistent metadata corresponding to the cached data. Based on the persistent metadata, the second database instance may generate, in volatile memory, the header data corresponding to the usable recoverable data. Furthermore, based on the header data, the second database instance may access the recoverable data stored in the low-latency form of non-volatile memory.

Cache Recovery for Instance Failure

When a database instance fails, data stored in non-volatile memory may be recovered based on persistent metadata that corresponds to the data. Referring to FIG. 1, secondary persistent storage 112 stores set of persistent metadata 118 and set of persistent metadata 124. Although FIG. 1 depicts secondary caches that store metadata, in some example embodiments, persistent metadata may be stored in non-volatile memory outside of any cache.

In some example embodiments, persistent metadata stored in non-volatile memory is a copy of metadata stored in volatile memory. For example, database instance 100 may modify set of metadata 110 in volatile memory 102. Thereafter, modifications to set of metadata 110 may be batched together and stored on secondary persistent storage 112 as set of persistent metadata 118. Set of metadata 110 and/or set of persistent metadata 118 may include one or more memory addresses, such as one or more data block addresses, corresponding to set of data 140 on primary persistent storage 138.

Persistent metadata stored in non-volatile memory includes information from which header data may be reconstructed in volatile memory. For example, set of persistent metadata 118 may be used to reconstruct set of header data 106 for set of data 116. Set of header data 106 may include one or more memory addresses, such as one or more block addresses, corresponding to set of data 116 on secondary persistent storage 112. The one or more memory addresses stored in set of header data 106 may be derived from index data for set of data 140.

Referring to FIG. 1, set of header data 106 may be a subset of a larger set of header data (not shown) that also includes data that is stored in primary cache 104 but is absent from secondary cache 114.

An operative instance may reconstruct header data directly or indirectly from persistent metadata of an inoperative instance. For example, when database instance 100 fails, database instance 126 may generate set of header data 106 in volatile memory 128 based on set of persistent metadata 118. Alternatively, when database instance 100 fails, database instance 126 may store set of persistent metadata 118 in volatile memory 128 as set of metadata 110. Thereafter, database instance 126 may generate set of header data 106 in volatile memory 128 based on set of metadata 110.

Prior to reconstructing header data of an inoperative instance, an operative instance becomes a master database instance for data corresponding to the header data. However, when the inoperative instance becomes operative again (hereinafter "recovered instance"), mastership of the data may be restored to the recovered instance. For example, if database instance 100 fails, database instance 126 may have mastership of set of data 116 in addition to set of data 122. However, when database instance 100 recovers, database instance 126 may transfer mastership of set of data 116 back to database instance 100. Database instance 100 may reacquire mastership of set of data 116 and reconstruct set of header data 106 in volatile memory 102. Database instance 100 may reconstruct set of header data 106 using any of the aforementioned approaches for reconstructing header data of an inoperative instance. Additionally or alternatively, when database instance 100 reacquires mastership of set of data 116, database instance 126 may send, via an interconnect, header data or metadata corresponding to set of data 116, thereby enabling database instance 100 to avoid retrieving set of persistent metadata 118 from secondary persistent storage 112.

As mentioned above, an operative instance may become an interim master instance on behalf of an inoperative instance. Any instance performing database recovery, such as by applying redo records or undo records, may be a candidate for interim mastership. However, determining which operative instance is to become the interim master instance may be based on one or more of a variety of considerations. For example, operative instances may compete for interim mastership based on vying for a global lock. Additionally or alternatively, interim mastership may be determined based on a proximity of an operative instance's secondary cache to the inoperative instance's secondary cache.

Database Recovery of Cached Data in Secondary Cache

Modifying cached data typically incurs less overhead than modifying data stored on primary persistent storage 138. Thus, database changes are made to cached data that is stored in primary cache 104 or 130. These database changes may be stored in shared volatile memory as one or more redo records. Thereafter, the cached data in its modified form (hereinafter "modified data") may be moved to primary persistent storage 138. A copy of the modified data may be cached in secondary cache 114 in conjunction with moving the modified data to primary persistent storage 138.

According to an embodiment, secondary cache 114 and set of persistent metadata 118 are maintained such that set of persistent metadata 118 indicates whether data in secondary cache 114 is valid or invalid. Both validation and invalidation may be written lazily to persistent metadata and may be batched. However, persistent metadata is invalidated before modified data is written to primary persistent storage 138. For example, when a copy of data in secondary cache 114 is modified in primary cache 130 to generate modified data, set of persistent metadata 118 may be modified to indicate that the data in secondary cache 114 is invalid. The modified data may be written to primary persistent storage 138, and a copy of the modified data may be written to secondary cache 114. When the copy of the modified data is written to secondary cache 114, set of persistent metadata 118 may be modified to indicate that the copy of the modified data is a valid copy of the modified data stored in primary persistent storage 138.

Database changes may be implemented as transactions that are executed on a database. A transaction effects one or more changes to a database based on one or more instructions that are processed as a single logical operation. For example, the Structured Query Language (SQL) commands "INSERT", "UPDATE", and "DELETE" may be processed as a single transaction. Any changes implemented by a particular transaction are persisted when the particular transaction commits. However, when a transaction fails to commit, data affected by the transaction may undergo a "rollback" operation that restores the data to a previous state. For example, a previous version of the data may be stored as an undo record in shared volatile memory. Thus, a "rollback" operation may involve replacing modified data with data from an undo record.

Modified data may be moved to primary persistent storage 138 for a number of different reasons. For example, modified data may be moved to primary persistent storage 138 when a transaction resulting in the modified data commits. When the transaction commits, the one or more redo records corresponding to the modified data is also moved to primary persistent storage 138. Additionally or alternatively, modified data may be moved to primary persistent storage 138 as part of cache management of primary cache 130, regardless of whether a transaction resulting in the modified data commits.

A database instance may fail at any time. However, a surviving database instance may enable a database recovery based on database state information available from redo records or undo records. In other words, a surviving database instance may enable picking up where a failed database instance left off. For example, a surviving database instance may determine that particular data in primary persistent storage 138 was modified by an uncommitted transaction. Thus, the surviving database instance may enable a database recovery process to apply undo records to the particular data. As another example, a surviving database instance may determine that particular data in volatile memory was modified by a committed transaction but the particular data was not written to primary persistent storage 138. Thus, the surviving database instance may enable a database recovery process to apply redo records to corresponding data stored in primary persistent storage 138.

As mentioned above, set of persistent metadata 118, 124 indicates whether or not data in secondary persistent storage 112 is a valid copy of the data in primary persistent storage 138. Thus, when a database recovery process applies redo records and/or undo records to data in primary persistent storage 138, the database recovery process may cause corresponding data cached on secondary persistent storage 112 to become invalid. In such scenarios, a surviving database instance may avoid generating header data corresponding to invalid data cached on secondary persistent storage 112. This may be achieved based on invalidating persistent metadata that corresponds to invalid data. Thus, the surviving database instance enables selective retention of data cached on secondary persistent storage 112.

In some example embodiments, data cached on secondary persistent storage 112 may be used during database recovery instead of data stored on primary persistent storage 138. Advantageously, this can significantly reduce database recovery time.

Cache Recovery for System Failure

When all database instances in a cluster fail, any database state information stored in shared volatile memory may be lost. As a result, it may be impractical to selectively repopulate data cached on secondary persistent storage 112. Instead, an entire cache of data stored on secondary persistent storage 112 may be repopulated if there is any inconsistency with corresponding data stored on primary persistent storage 138. For example, if data stored in secondary cache 114 differs from corresponding data stored on primary persistent storage 138, then the data stored in secondary cache 114, as well as any metadata corresponding to it, may be ignored.

Any differences between data stored on primary persistent storage 138 and corresponding data stored in a particular secondary cache may be detected based on comparing version identifiers. If a version identifier for data stored on primary persistent storage 138 matches a version identifier for corresponding data stored in a particular secondary cache, the corresponding data may be treated as valid. Header data may be generated for valid data. However, if the version identifiers fail to match, the corresponding data may be ignored as invalid. Generating header data may be avoided for invalid data.

Among other information, a database control file may include a version identifier for data stored on persistent storage. Referring to FIG. 1, primary persistent storage 138 stores database control file 144. Database control file 144 may be a binary record of a database's status and/or physical structure. The version identifier may be updated whenever a corresponding database is mounted. In other words, a version identifier may indicate a version of a database.

Figure 2:
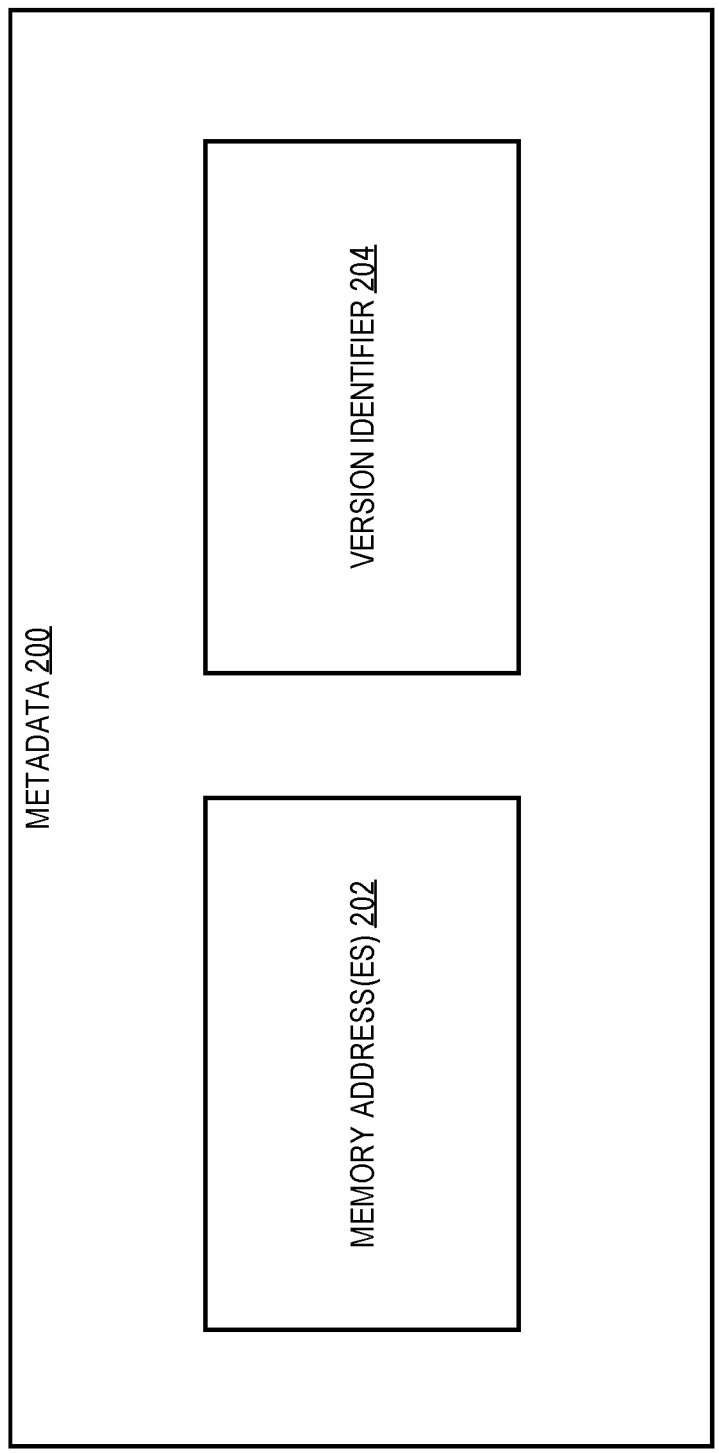
FIG. 2 depicts a detailed view of metadata, in an example embodiment.

Among other information, metadata may include a version identifier for data stored in a particular secondary cache. Referring to FIG. 2, metadata 200 includes memory address(es) 202 and version identifier 204. For example, metadata 200 may correspond to set of persistent metadata 118, and memory address(es) 202 may correspond to one or more locations in secondary persistent storage 112 where set of data 116 is stored. Version identifier 204 may be updated whenever data is stored on primary persistent storage 138. In other words, a version identifier may indicate a version of primary persistent storage 138. In some example embodiments, version identifier 204 may be stored in a header portion of set of persistent metadata 118.

After a cluster outage, instances may come back up concurrently. In such a scenario, each instance may reconstruct its own header data. For example, database instance 100 and database instance 126 may retrieve set of persistent metadata 118 and set of persistent metadata 124, respectively. Database instance 100 may compare version identifiers in set of persistent metadata 118 and database control file 144. Similarly, database instance 126 may compare version identifiers in set of persistent metadata 124 and database control file 144. If the version identifiers match, database instance 100 and database instance 126 recreate set of header data 106 and set of header data 132, respectively. However, if any of the version identifiers fail to match, a corresponding secondary cache may be ignored in its entirety. For example, if a version identifier in database control file 144 matches a version identifier for secondary cache 114 but fails to match a version identifier for secondary cache 120, set of header data 106 may be recreated, but set of header data 132 may avoid being recreated.

Alternatively, instances may come back up at significantly different times after a cluster outage. In such a scenario, the first instance(s) to come back up may compare version identifiers and transfer mastership back to any failed instances that come back up afterward. For example, database instance 126 may retrieve set of persistent metadata 118 and set of persistent metadata 124 from secondary persistent storage 112. Database instance 126 may compare a version identifier in database control file 144 to a respective version identifier in each of set of persistent metadata 118 and set of persistent metadata 124. Depending on whether the version identifier in database control file 144 matches any other version identifier, database instance 126 may generate set of header data 106 and/or set of header data 132 in volatile memory 128. If database instance 100 comes back up, database instance 126 may transfer mastership of secondary cache 114 back to database 100.

Lazy Data Write

Further efficiency may be achieved based on reducing computational overhead involved in writing to non-volatile memory. This may be achieved based on writing to non-volatile memory in a lazy manner. In other words, writing to non-volatile memory may occur on an "as-needed" basis. According to some embodiments, such "lazy" writes may include multiple updates to different metadata in a single write.

Figure 3:
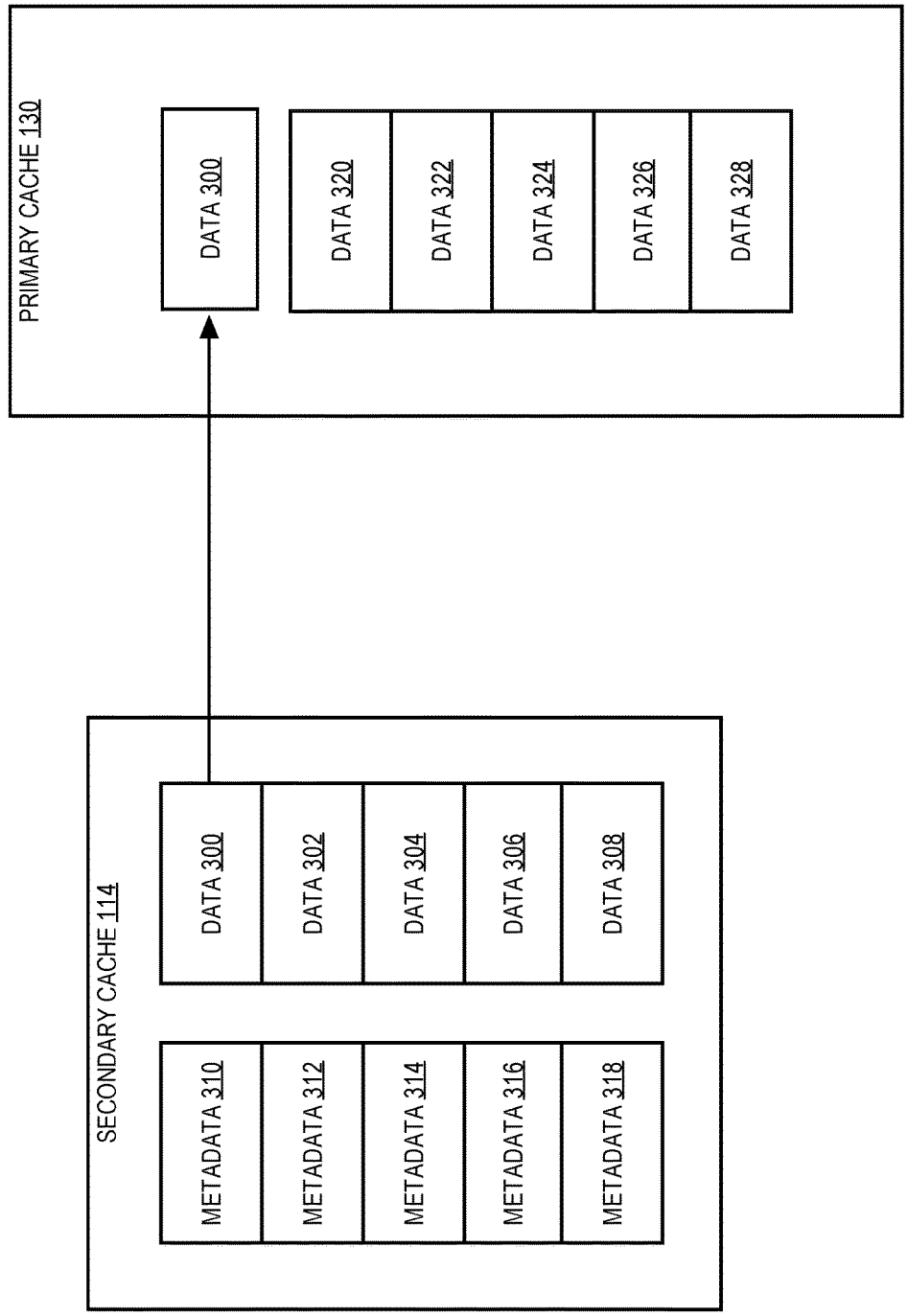
FIG. 3 depicts an example approach for accessing data stored in a secondary cache.

Referring to FIG. 3, primary cache 130 includes data 320-328, and secondary cache 114 includes data 300-308 and metadata 310-318 corresponding to data 300-308. As mentioned above secondary cache 114 may serve as an extension of primary cache 130. Thus, primary cache 130 and secondary cache 114 generally avoid storing duplicative data. For example, if secondary cache 114 stores data 302, then primary cache 130 avoids storing data 302, and if primary cache 130 stores data 320, then secondary cache 114 avoids storing data 320.

In some example embodiments, however, primary cache 130 and secondary cache 114 may store duplicative data when data stored in secondary cache 114 is being read. In the example of FIG. 3, database instance 126 retrieves data 300 from secondary cache 114 and stores a copy of data 300 in primary cache 130. As mentioned above, data is typically read from volatile memory, so reading data stored in non-volatile memory may involve copying the data to volatile memory.

Advantageously, copying data from non-volatile memory to volatile memory without deleting the data from non-volatile memory avoids computational overhead involved in writing to non-volatile memory. For example, moving data 300 from secondary cache 114 to primary cache 130 would have involved invalidating metadata 310 and/or deleting data 300 from secondary cache 114. During a read, however, data 300 remains unmodified. Thus, data 300 in secondary cache 114 remains consistent with data 300 in primary cache 130. Hence, secondary cache 114 may continue to store data 300 so that it remains accessible to any other database instance. Furthermore, if data 300 remains unmodified after being read in primary cache 130, data 300 may be moved back to secondary cache 114. Such a scenario would involve undoing the invalidating metadata 310 and/or the deleting data 300 from secondary cache 114, thereby involving multiple sets of writes that could have been avoided.

Figure 4:
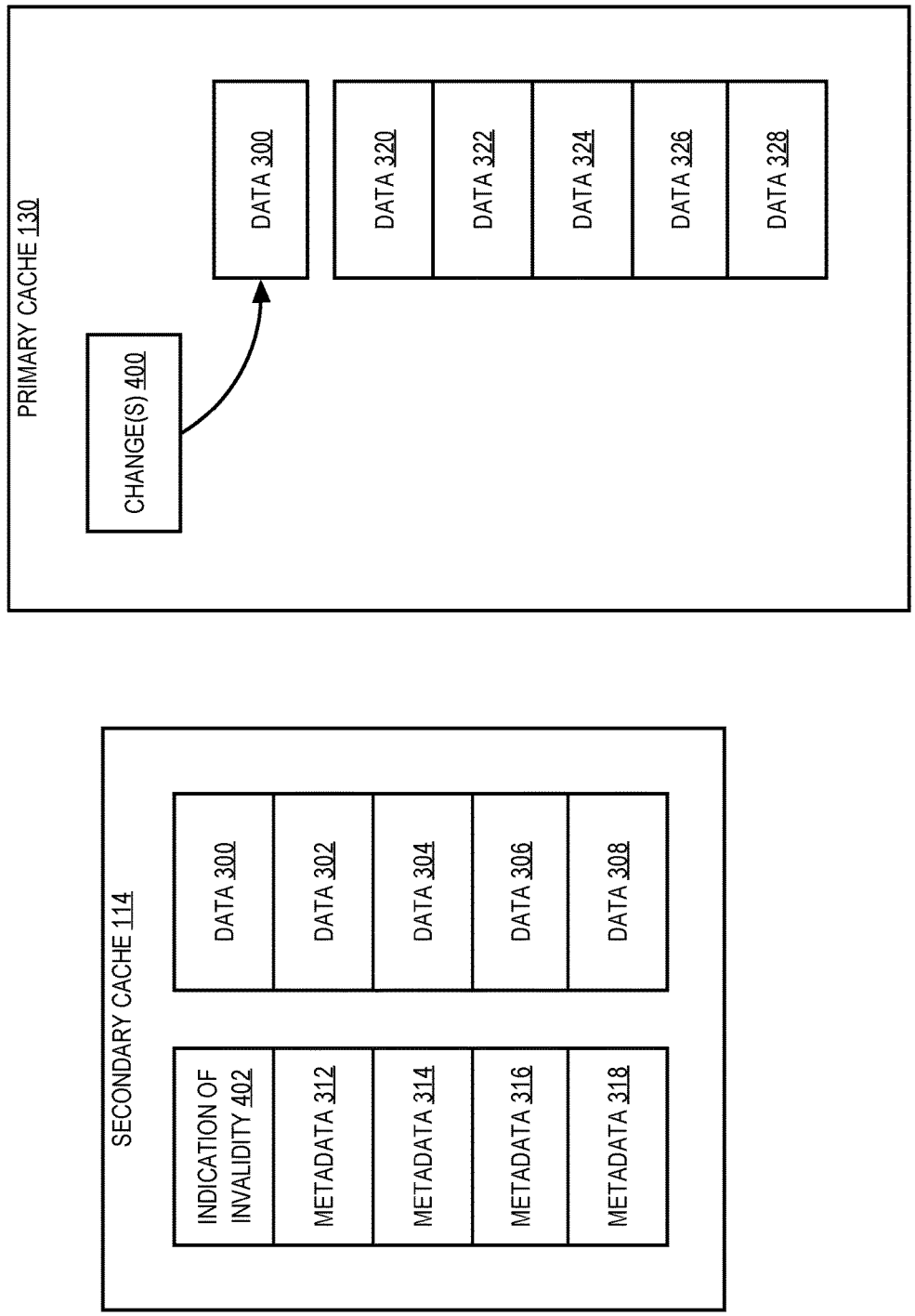
FIG. 4 depicts an example approach for modifying data stored in a secondary cache.
Figure 5:
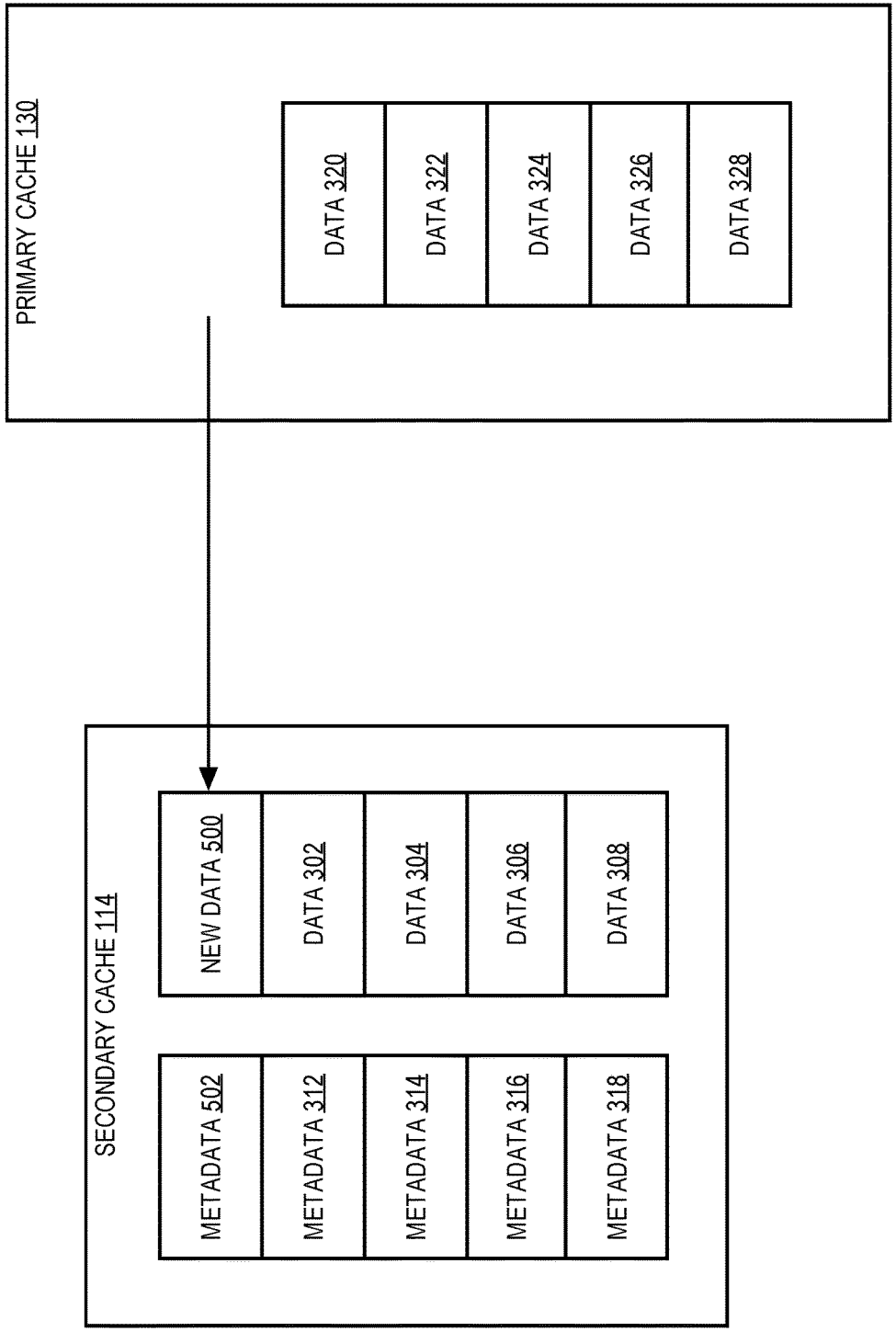
FIG. 5 depicts an example approach for storing data in a secondary cache.

To avoid unnecessarily modifying data and/or metadata stored in non-volatile memory, a database instance may avoid writing to non-volatile memory except when modifying or replacing data stored in non-volatile memory. FIG. 4 depicts an approach for modifying data stored in non-volatile memory, and FIG. 5 depicts an approach for replacing data in non-volatile memory.

Referring to FIG. 4, data 300 is retrieved from secondary cache 114 and copied into primary cache 130 as in FIG. 3. However, FIG. 4 depicts modifying data 300 based on applying change(s) 400 to data 300 in primary cache 130. In such a scenario, data 300 in secondary cache 114 becomes stale data. Thus, it may be necessary to write to non-volatile memory at least to store indication of invalidity 402. Referring to FIG. 4, data 300 in secondary cache 114 awaits being overwritten. However, indication of invalidity 402, which corresponds to metadata 310, may be queued for lazy write to secondary cache 114. Thus, indication of invalidity 402 is written to secondary cache 114 before a modified version of data 300 is written to primary persistent storage 138. In case of instance failure, a database recovery process will notice indication of invalidity 402 and avoid recreation of header data or invalidate header data corresponding to data 300, depending on whether the database recovery process noticed indication of invalidity 402 first or whether a cache recovery process scanned metadata 310 first.

In some example embodiments, indication of invalidity 402 may be stored in a header portion of set of persistent metadata 118. In some example embodiments, metadata 310 may include indication of invalidity 402. For example, indication of invalidity 402 may be a bit flag or an invalid memory address. Indication of invalidity 402 may prevent database instance 126 from generating header data based on metadata 310. Additionally or alternatively, indication of invalidity 402 may prevent any other database instances from relying on data 300 in secondary cache 114.

In some example embodiments, modifying data 300 may involve storing modified data on primary persistent storage 138 and/or secondary persistent storage 112. Storing data on secondary persistent storage 112 may further involve storing, in secondary persistent storage 112, metadata corresponding to the data. For example, indication of invalidity 402 may be stored in non-volatile memory when a modified version of data 300 is stored in secondary cache 114. In some example embodiments, the modified version of data 300 may be stored, in non-volatile memory, separately from data 300 and indication of invalidity 402. For example, the modified version of data 300 may be stored as data 330 (not shown) along with metadata 332 (not shown), which indicates that data 330 is valid. In some example embodiments, data 330 (not shown) may replace data 300, and metadata 332 (not shown) may serve as indication of invalidity 402 by replacing metadata 310.

FIG. 5 depicts the latter embodiment when new data 500 and metadata 502 replace data 300 and metadata 310, respectively. For example, data 300 may be, in effect, evicted from secondary cache 114 due to infrequency of access. Note that when new data 500 is moved from primary cache 130 to secondary cache 114, any copy of new data 500 is deleted from primary cache 130. Furthermore, replacing metadata 310 with metadata 502 may involve replace indication of invalidity 402 with an indication of validity.

Process Overview

Figure 6:
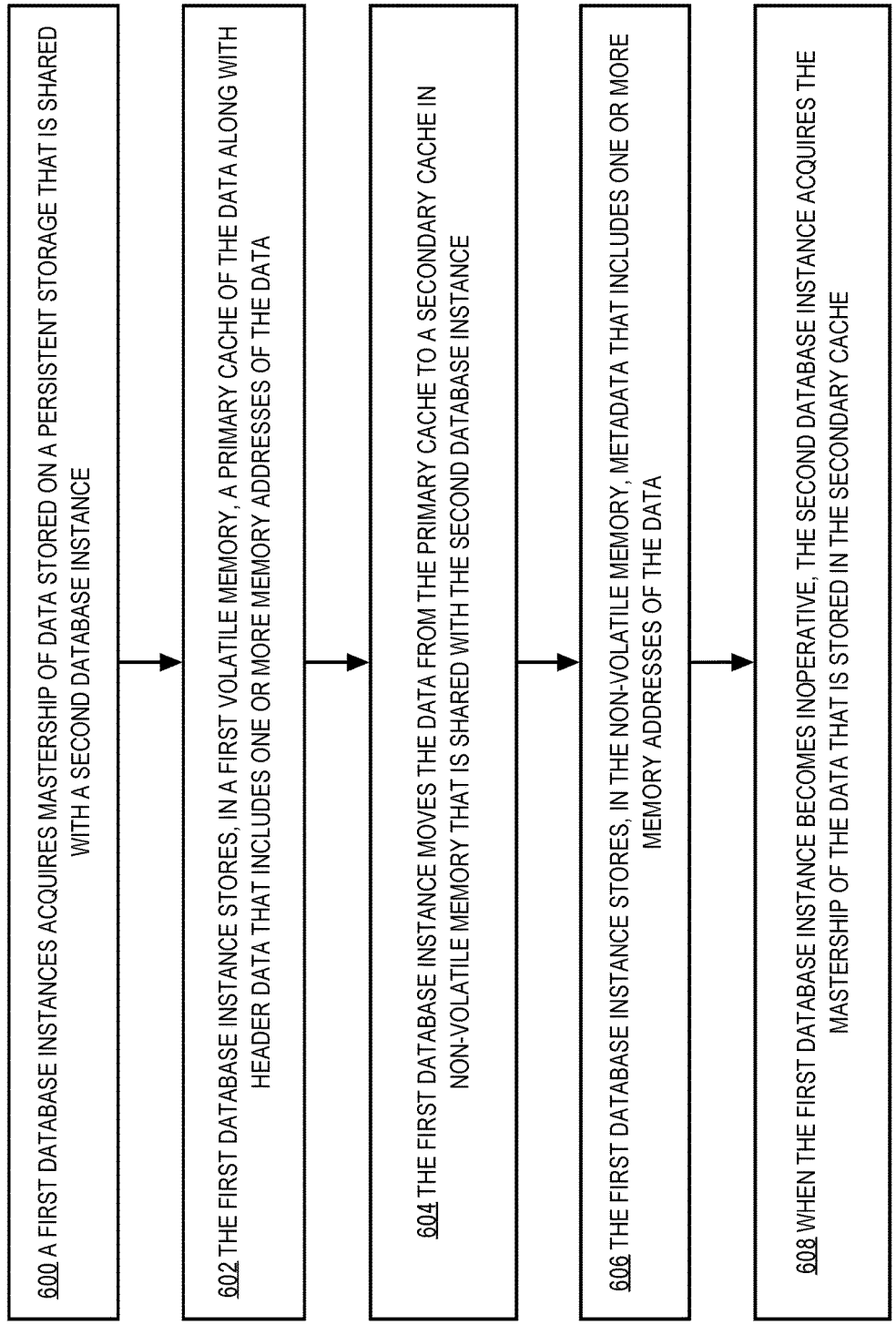
FIG. 6 is a flow diagram that depicts an approach for recovering data cached by a failed database instance.

FIG. 6 is a flow diagram that depicts an approach for recovering data cached by a failed database instance. At block 600, a first database instance acquires mastership of data stored on a persistent storage that is shared with a second database instance. Thus, the first database instance may determine whether to permit any other database instance to access the data. Accessing data may involve reading, modifying, and/or replacing the data.

At block 602, the first database instance stores the data in a primary cache in a first volatile memory. The first database instance also stores, in the first volatile memory, header data that includes one or more memory addresses of the data.

At block 604, the first database instance moves the data from the first primary cache to a secondary cache in non-volatile memory that is shared with the second database instance. The first database instance may modify the header data to include one or more memory addresses in the secondary cache.

At block 606, the first database instance stores, in the non-volatile memory, metadata that corresponds to the data. The metadata includes one or more memory addresses of the data in the secondary cache.

Figure 7:
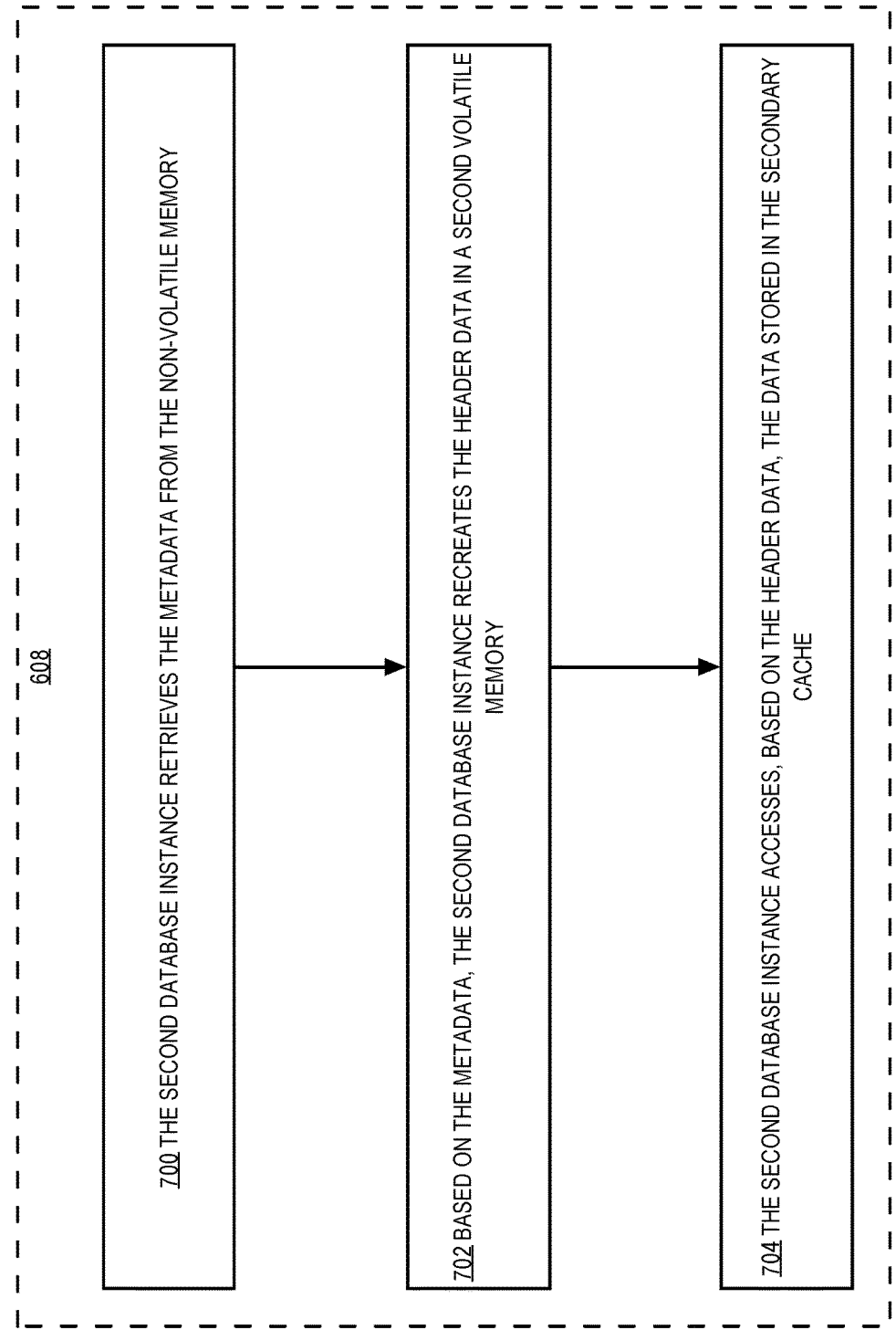
FIG. 7 is a flow diagram that depicts an approach for acquiring mastership of data cached by a failed database instance.

At block 608, when the first database instance becomes inoperative, the second database instance acquires the mastership of the data that is stored in the secondary cache. FIG. 7 is a flow diagram that provides further details of block 608.

At block 700, the second database instance retrieves the metadata from the non-volatile memory. For example, the second database instance may store a copy of the metadata in a second volatile memory that corresponds to the second database instance.

At block 702, based on the metadata, the second database instance recreates the header data in the second volatile memory. The second database instance may avoid recreating any of the header data that corresponds to any of the data that is modified by a database recovery process.

At block 704, based on the header data, the second database instance accesses the data stored in the secondary cache. Unless accessing the data involves modifying or replacing the data, the second database instance may avoid updating the metadata corresponding to the data in the non-volatile memory.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
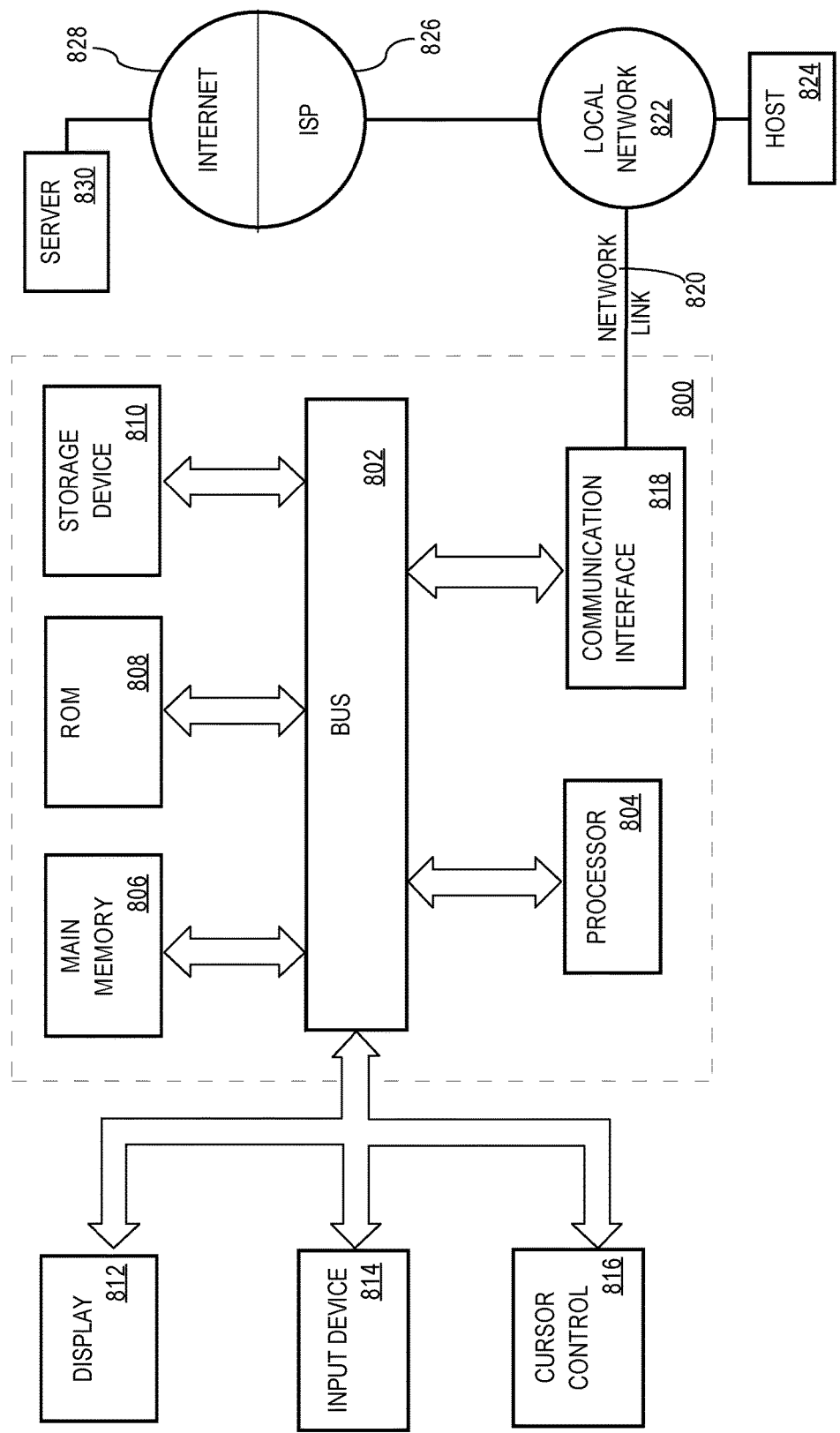
FIG. 8 depicts a computer system upon which an embodiment may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   for each database instance of a plurality of database instances comprising a first database instance and a second database instance:
      storing, in volatile memory, a respective primary cache of a respective set of data along with a respective set of header data including one or more memory addresses of said respective set of data, said respective set of data being stored on a primary persistent storage shared by said plurality of database instances;
      moving said respective set of data from said respective primary cache to a respective secondary cache on a secondary persistent storage, said secondary persistent storage being shared by said plurality of database instances and being separate from said primary persistent storage;
storing, on said secondary persistent storage, a respective set of persistent metadata including one or more memory addresses of said respective set of data;
when said first database instance becomes inoperative, said second database instance:
retrieving, from said secondary persistent storage, the respective persistent metadata of said first database instance corresponding to data stored, on said secondary persistent storage, in the respective secondary cache of said first database instance;
based on the respective said persistent metadata of said first database instance, generating first header data corresponding to said data stored in the respective secondary cache of said first database instance;
after generating said first header data, accessing, based on said first header data, said data in the respective secondary cache of said first database instance;
wherein said method is performed by one or more computing devices.

2. Said method of claim 1, further comprising, after accessing, based on said first header data, said data stored in the respective secondary cache of said first database instance, determining, by said second database instance, whether to permit any other database instance of said plurality of database instances to access said data stored in the respective secondary cache of said first database instance.

3. Said method of claim 1, further comprising, when said first database instance becomes operative again, said first database instance determining whether to permit any other database instance of said plurality of database instances to access said data stored in the respective secondary cache of said first database instance.

4. Said method of claim 1, further comprising, after said plurality of database instances becomes inoperative, said each database instance of said plurality of database instances:
retrieving, from said secondary persistent storage, the respective persistent metadata of said each database instance,
comparing a respective version identifier included in said respective set of persistent metadata to a version identifier in a database control file shared by said plurality of database instances,
if said respective version identifier matches said version identifier, recreating said respective set of header data of said each database instance based on said respective persistent metadata,
after recreating said respective header data, accessing said respective secondary cache of said each database instance based on said respective header data.

5. Said method of claim 1, wherein accessing said data stored in the respective secondary cache of said first database instance comprises:
replacing, with new data, said data stored in the respective secondary cache of said first database instance;
updating, to reflect said replacing, said respective persistent metadata of said first database instance corresponding to said data stored in the respective secondary cache of said first database instance.

6. Said method of claim 1, wherein accessing said data stored in the respective secondary cache of said first database instance comprises:
storing data in the respective primary cache of said second database instance that is a copy of said data stored in the respective secondary cache of said first database instance;
avoiding updating said persistent metadata corresponding to said data stored in the respective secondary cache of said first database instance.

7. Said method of claim 6, further comprising, after storing data in the respective primary cache of said second database instance, modifying said data in the respective primary cache of said second database instance.

8. Said method of claim 7, wherein modifying said data in the respective primary cache comprises applying, to said data in the respective primary cache of said second database instance, one or more changes to said data in the respective primary cache of said second database instance made by said first database instance prior to becoming inoperative.

9. Said method of claim 7, further comprising, after modifying said data in the respective primary cache of said second database instance storing a copy of said data in the respective primary cache of said second database instance on said primary persistent storage and said secondary persistent storage.

10. Said method of claim 7, further comprising:
after modifying said data in the respective primary cache of said second database instance, moving said data in the respective primary cache of said second database instance from the respective primary cache of said second database instance to a particular secondary cache of said first database instance on said secondary persistent storage;
updating, to reflect said modifying, said persistent metadata corresponding to said data stored in the respective secondary cache of said first database instance.

11. One or more non-transitory storage media storing a set of instructions that, when executed by one or more computing devices, cause:
for each database instance of a plurality of database instances comprising a first database instance and a second database instance:
storing, in volatile memory, a respective primary cache of a respective set of data along with a respective set of respective header data including one or more memory addresses of said respective set of data, said respective set of data being stored on a primary persistent storage shared by said plurality of database instances;
moving said respective set of data from said respective primary cache to a respective secondary cache on a secondary persistent storage, said secondary persistent storage being shared by said plurality of database instances and being separate from said primary persistent storage;
storing, on said secondary persistent storage, respective persistent metadata including one or more memory addresses of said respective set of data;
when said first database instance becomes inoperative, said second database instance:
retrieving, from said secondary persistent storage, the respective persistent metadata of said first database instance corresponding to data stored, on said secondary persistent storage, in the respective secondary cache of said first database instance;
based on the respective persistent metadata, of said first database instance, generating first header data corresponding to said data stored in the respective secondary cache of said first database instance; and after generating said header data, accessing, based on said header data, said data in the respective secondary cache of said first database instance.

12. Said one or more non-transitory storage media of claim 11, wherein said set of instructions further comprises instructions that, when executed by said one or more computing devices, cause:
after accessing, based on said first header data, said data stored in the respective secondary cache of said first database instance, determining, by said second database instance, whether to permit any other database instance of said plurality of database instances to access said data stored in the secondary cache of said first database instance.

13. Said one or more non-transitory storage media of claim 11, wherein said set of instructions further comprises instructions that, when executed by said one or more computing devices, cause:
when said first database instance becomes operative again, said first database instance determining whether to permit any other database instance of said plurality of database instances to access said data stored in the respective secondary cache of said first database instance.

14. Said one or more non-transitory storage media of claim 11, wherein said set of instructions further comprises instructions that, when executed by said one or more computing devices, cause:
retrieving, from said secondary persistent storage, the respective persistent metadata of said each database instance,
comparing a respective version identifier included in said respective persistent metadata to a version identifier in a database control file shared by said plurality of database instances,
if said respective version identifier matches said version identifier, recreating said respective header data of said each database instance based on said respective persistent metadata,
after recreating said respective header data, accessing said respective secondary cache of said each database instance based on said respective header data.

15. Said one or more non-transitory storage media of claim 11, wherein accessing said data stored in the respective secondary cache of said first database instance comprises:
replacing, with new data, said data stored in the respective secondary cache of said first database instance;
updating, to reflect said replacing, said respective persistent metadata of said first database instance corresponding to said data stored in the respective secondary cache of said first database instance.

16. Said one or more non-transitory storage media of claim 11, wherein accessing said data stored in the respective secondary cache of said first database instance comprises:
storing data in the respective primary cache of said second database instance that is a copy of said data stored in the respective secondary cache of said first database instance;
avoiding updating said persistent metadata corresponding to said data stored in the respective secondary cache of said first database instance.

17. Said one or more non-transitory storage media of claim 15, wherein said set of instructions further comprises instructions that, when executed by said one or more computing devices, cause:
after storing data in the respective primary cache of said second database instance, modifying said data in the respective primary cache of said second database instance.

18. Said one or more non-transitory storage media of claim 17, wherein modifying said data in the respective primary cache comprises applying, to said data in the respective primary cache of said second database instance, one or more changes to said data in the respective primary cache of said second database instance made by said first database instance prior to becoming inoperative.

19. Said one or more non-transitory storage media of claim 17, wherein said set of instructions further comprises instructions that, when executed by said one or more computing devices, cause:
after modifying said data in the respective primary cache of said second database instance, storing a copy of said data in the respective primary cache of said second database instance on said primary persistent storage and said secondary persistent storage.

20. Said one or more non-transitory storage media of claim 17, wherein said set of instructions further comprises instructions that, when executed by said one or more computing devices, cause:
after modifying said data in the respective primary cache of said second database instance, moving said data in the respective primary cache of said second database instance from the respective primary cache of said second database instance to a particular secondary cache of said first database instance on said secondary persistent storage; and
updating, to reflect said modifying, said persistent metadata corresponding to said data stored in the respective secondary cache of said first database instance.

* * * * *